United States Patent
Yokoyama et al.

(10) Patent No.: US 8,673,471 B2
(45) Date of Patent: Mar. 18, 2014

(54) PORTABLE ELECTRONIC DEVICE

(75) Inventors: Tomohiko Yokoyama, Osaka (JP); Hideharu Takezawa, Nara (JP); Kazuya Iwamoto, Osaka (JP); Taisuke Yamamoto, Nara (JP)

(73) Assignee: Panasonic Corporation, Osaka (JP)

( * ) Notice: Subject to any disclaimer, the term of this patent is extended or adjusted under 35 U.S.C. 154(b) by 630 days.

(21) Appl. No.: 12/866,206

(22) PCT Filed: Sep. 18, 2009

(86) PCT No.: PCT/JP2009/004751
§ 371 (c)(1),
(2), (4) Date: Aug. 4, 2010

(87) PCT Pub. No.: WO2010/032484
PCT Pub. Date: Mar. 25, 2010

(65) Prior Publication Data
US 2011/0064983 A1    Mar. 17, 2011

(30) Foreign Application Priority Data

Sep. 22, 2008 (JP) .................................. 2008-242147
Sep. 22, 2008 (JP) .................................. 2008-242149

(51) Int. Cl.
*H01M 2/10* (2006.01)
*H01M 10/50* (2006.01)

(52) U.S. Cl.
USPC .......................................... 429/100; 429/120

(58) Field of Classification Search
USPC ............ 429/96, 100, 163, 164, 171–176, 120
See application file for complete search history.

(56) References Cited

U.S. PATENT DOCUMENTS 6,521,834 B1 * 2/2003 Dykhoff et al. .................. 174/66
2008/0158817 A1 * 7/2008 Tsunoda et al. ............... 361/697

FOREIGN PATENT DOCUMENTS

| JP | 04-162346 | 6/1992 |
|---|---|---|
| JP | 05-234573 | 9/1993 |
| JP | 08-162169 | 6/1996 |
| JP | 09-082293 | 3/1997 |
| JP | 10-046015 | 2/1998 |
| JP | 10-306208 | 11/1998 |
| JP | 2002-025519 | 1/2002 |
| JP | 2002-319652 | 10/2002 |
| JP | 2005-252687 | 9/2005 |
| JP | 2008-131512 | 6/2008 |
| JP | 2009-021223 | 1/2009 |
| WO | WO 2007/029311 A1 | 3/2007 |
| WO | WO 2008/062879 A1 | 5/2008 |
| WO | WO 2008/152803 A1 | 12/2008 |

* cited by examiner

*Primary Examiner* — Carlos Barcena
(74) *Attorney, Agent, or Firm* — McDermott Will & Emery LLP

(57) ABSTRACT

Provided is a highly safe portable electronic device having a secondary battery as a power source, and including a housing, an electronic device body housed in the housing, and a battery housing portion housed in the housing, in which a surface is inhibited from being locally heated to high temperature. In the portable electronic device, the battery housing portion is a molding with a battery fitting portion for fitting the secondary battery therein, and the battery fitting portion has provided on its surface a heat-insulating layer having a thickness of from 500 to 3000 μm and a thermal conductivity of 0.2 W/m·K or lower.

7 Claims, 5 Drawing Sheets

PORTABLE ELECTRONIC DEVICE

RELATED APPLICATIONS

This application is the U.S. National Phase under 35 U.S.C. §371 of International Application No. PCT/JP2009/004751, filed on Sep. 18, 2009, which in turn claims the benefit of Japanese Application Nos. 2008-242147, filed on Sep. 22, 2008 and 2008-242149 filed on Sep. 22, 2008, the disclosures of which Applications are incorporated by reference herein.

TECHNICAL FIELD

The present invention relates to portable electronic devices. More specifically, the present invention relates to improvements to package structures for housing secondary batteries as power sources.

BACKGROUND ART

For portable electronic devices, such as cell phones, personal digital assistants, notebook computers, camcorders, and handheld game machines, advanced functionality results in an increased number of heat-generating components mounted on a board. In use of the portable electronic device, heat dissipation from heat-generating components might cause the package surface to be locally heated to high temperature.

Patent Document 1 discloses a structure in which heat from heat-generating components housed in the package of a portable electronic device is advantageously diffused by a heat-conducting member with superior heat dissipation performance which is arranged around the heat-generating components. Examples of the heat-conducting member include metallic materials such as aluminum alloy, magnesium alloy, stainless steel, and plain steel.

Patent Documents 2 to 4 disclose flame-retarded resin compositions being used as materials for packages and components of electronic devices. Specifically, Patent Document 2 discloses a flame-retardant resin composition which includes aromatic polycarbonate having a phosphorous flame retardant added thereto. Patent Document 3 discloses a flame-retardant resin composition which includes polycarbonate having a halogen flame retardant added thereto. Patent Document 4 discloses a flame-retardant resin composition which includes polyphenylene ether having a phosphoric acid ester compound added thereto.

Patent Document 5 discloses a resin composition containing a heat-absorbing material such as aluminum hydroxide or magnesium hydroxide. Aluminum hydroxide and magnesium hydroxide reduce combustion heat by being heated. Also, such an endothermic reaction is a reaction in which water is released. The endothermic reaction as such exerts a flame retardant effect.

Incidentally, secondary batteries, such as lithium-ion secondary batteries and nickel-metal hydride storage batteries, which have high capacity and high energy density, can be readily reduced in size and weight. Accordingly, they are widely used as power sources for portable electronic devices.

Such a secondary battery when it is in abnormal condition could abruptly generate heat due to its high energy density. Such heat generation might abruptly increase the surface temperature of the secondary battery.

Patent Document 6 discloses a battery pack including an exterior case, batteries housed in the exterior case, and a heat-insulating layer formed between the inner surface of the exterior case and the batteries. Patent Document 6 also discloses that such a heat-insulating layer prevents reduction in battery performance due to lowered environmental temperature.

Patent Document 1: International Publication WO2008/062879 pamphlet
Patent Document 2: Specification of Japanese Patent No. 3682148
Patent Document 3: Japanese Laid-Open Patent Publication No. 10-46015
Patent Document 4: Japanese Laid-Open Patent Publication No. 9-82293
Patent Document 5: Specification of Japanese Patent No. 3408676
Patent Document 6: Japanese Laid-Open Patent Publication No. 5-234573

DISCLOSURE OF THE INVENTION

Problem to be Solved by the Invention

An object of the present invention is to provide a portable electronic device having a high-energy density secondary battery as a power source and being capable of preventing conduction of generated heat to the package of the portable electronic device even when the secondary battery malfunctions and releases a large amount of heat, thereby inhibiting the package from being locally heated to high temperature in the vicinity where the secondary battery is housed.

Means for Solving the Problem

One aspect of the present invention is directed to a portable electronic device having a secondary battery as a power source, comprising a package, an electronic device body housed in the package, and a battery housing portion housed in the package, wherein the battery housing portion is a molding with a battery fitting portion for fitting the secondary battery therein, and the battery fitting portion has provided on its surface a heat-insulating layer having a thickness of from 500 to 3000 μm and a thermal conductivity of 0.2 W/m·K or lower.

Also, another aspect of the present invention is directed to a portable electronic device having a secondary battery as a power source, comprising a package, an electronic device body housed in the package, and a battery housing portion housed in the package, wherein the battery housing portion is a molding with a battery fitting portion for fitting the secondary battery therein and a lid portion for covering the fitted secondary battery, the battery fitting portion includes a heat dissipation layer having a thickness of from 10 to 200 μm and a thermal conductivity of 0.5 W/m·K or higher, the heat dissipation layer being formed on a surface of the battery fitting portion on the side of which the secondary battery is fitted, and the lid portion has provided on its surface a heat-insulating layer having a thickness of from 300 to 3000 μm and a thermal conductivity of 0.2 W/m·K or lower.

Objects, features, aspects, and advantages of the present invention will become more apparent from the following detailed description and the accompanying drawings.

Effect of the Invention

According to the present invention, even when a high-energy density secondary battery that is used as a power source of a portable electronic device malfunctions and releases a large amount of heat, it is possible to inhibit the package of the portable electronic device from locally experiencing a surface temperature rise in the vicinity where the secondary battery is housed.

BEST MODE FOR CARRYING OUT THE INVENTION

First Embodiment

Figure 1:
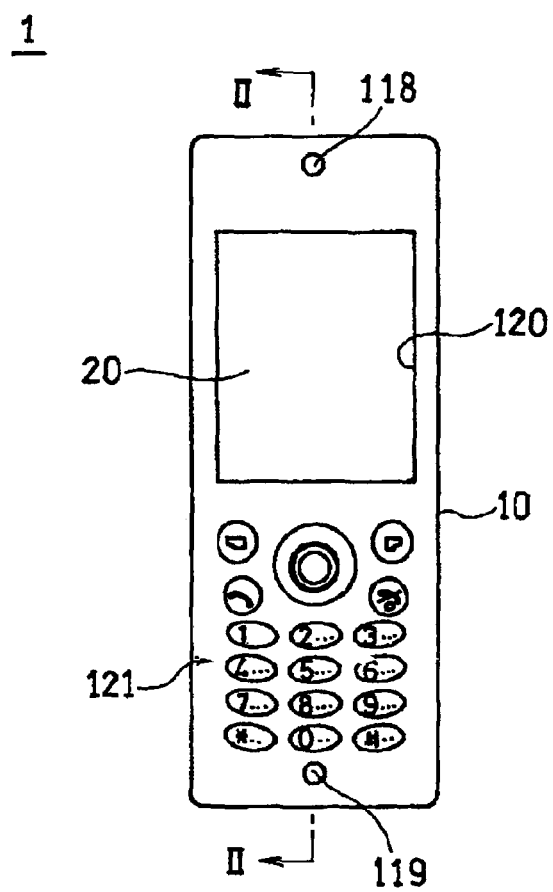
FIG. 1 is a top view schematically illustrating the appearance of a cell phone, which is a portable electronic device according to a first embodiment.
Figure 2:
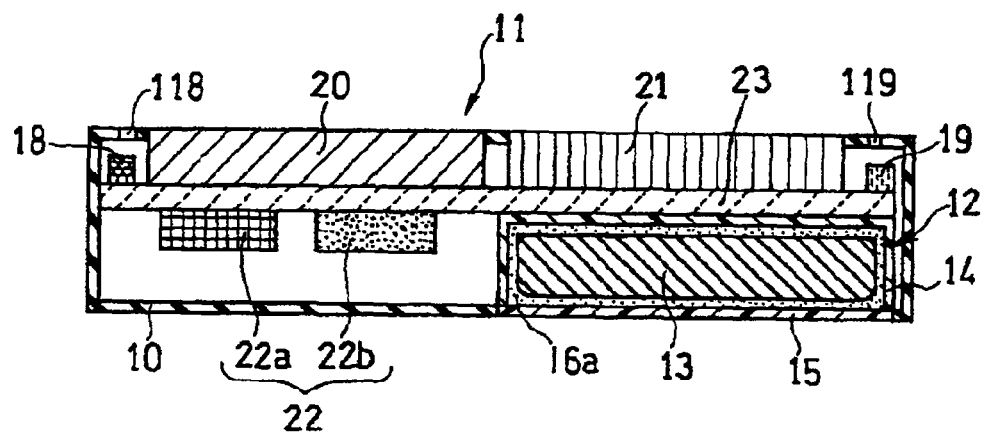
FIG. 2 is a cross-sectional view taken from line II-II of the cell phone shown in FIG. 1.
Figure 3:
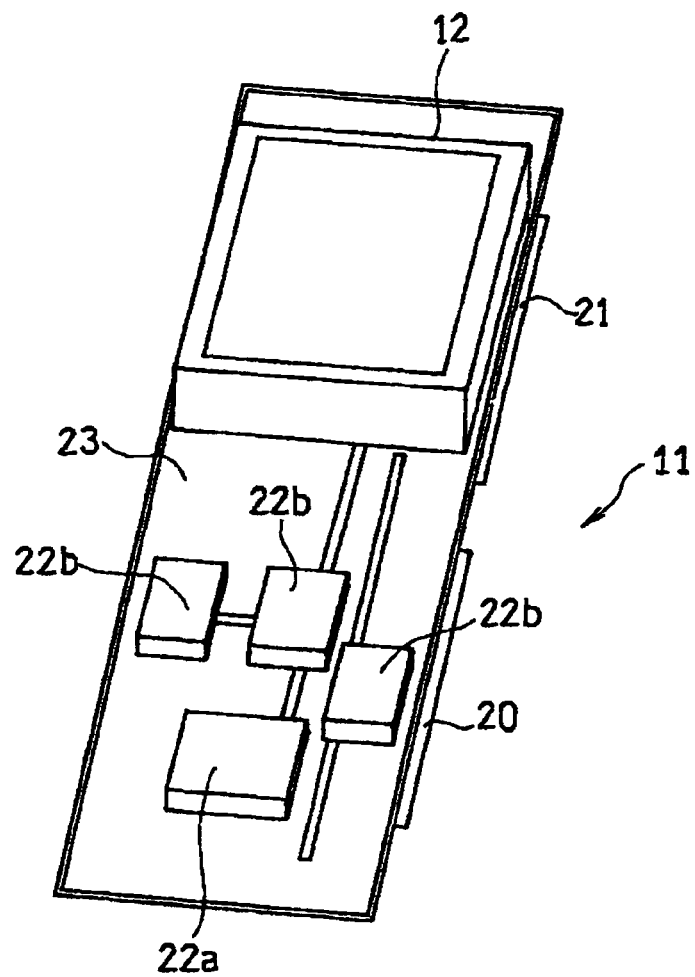
FIG. 3 is a perspective view schematically illustrating an electronic device body.
Figure 4:
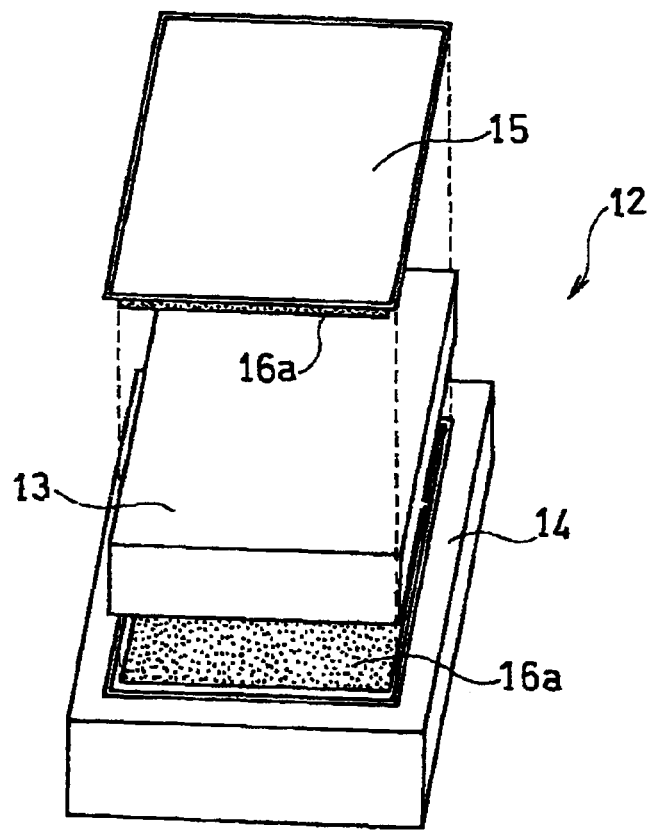
FIG. 4 is a perspective view schematically illustrating a battery housing portion.
Figure 5:
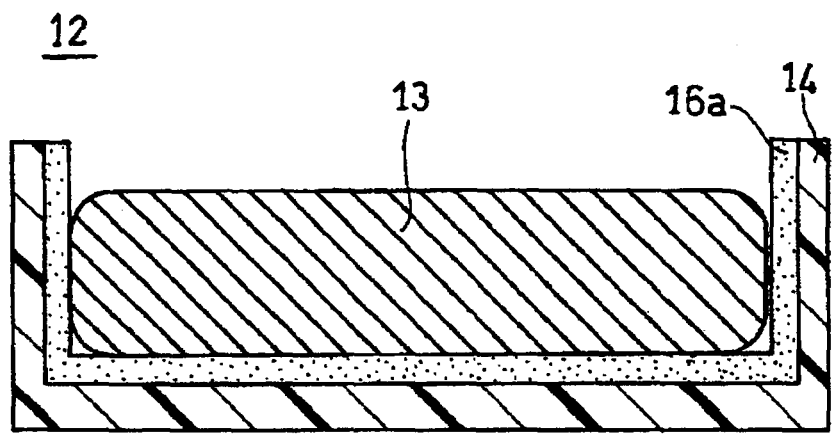
FIG. 5 is a longitudinal sectional view schematically illustrating in cross section the shape of the battery housing portion having a secondary battery housed therein.

FIG. 1 is a top view schematically illustrating the appearance of a cell phone 1, which is a portable electronic device in a first embodiment of the present invention. FIG. 2 is a cross-sectional view taken from line II-II of the cell phone 1 shown in FIG. 1. FIG. 3 is a perspective view of an electronic device body 11 and a battery housing portion 12. FIG. 4 is a perspective view of the battery housing portion 12 for housing a secondary battery 13. FIG. 5 is a longitudinal sectional view schematically illustrating in cross section the shape of the battery housing portion 12 having the secondary battery 13 housed therein.

First, the configuration of the cell phone 1 will be described.

The cell phone 1 includes a package 10, the electronic device body 11 housed in the package 10, the battery housing portion 12, and the secondary battery 13 housed in the battery housing portion 12, as shown in FIGS. 1 and 2. The electronic device body 11 includes a speaker 18, a microphone 19, an image display portion 20, an input operation portion 21, a circuit portion 22, and a circuit board 23.

As shown in FIG. 2, the speaker 18, the microphone 19, the image display portion 20, the input operation portion 21, and the circuit portion 22 are mounted on the circuit board 23 having predetermined circuitry formed thereon. The battery housing portion 12 includes positive and negative terminals by which the battery housing portion 12 is mounted at a predetermined position on the circuitry of the circuit board 23.

As shown in FIG. 2, the speaker 18 is disposed so as to face an earpiece hole 118 provided at a predetermined position in the package 10. Also, the microphone 19 is disposed so as to face a mouthpiece hole 119 provided at a predetermined position in the package 10. The image display portion 20 is disposed and fitted in a display hole 120 provided in the package 10 so that display can be recognized from outside.

The input operation portion 21 is disposed and fitted in an input portion 121 which is a face including a combination of input buttons provided in the package 10 such that the operator can input information. Note that the circuit board 23 may have a card connector and/or a small camera device additionally mounted on its surface as necessary.

The speaker 18 emits an incoming call notification sound and also outputs incoming speech. Outgoing speech is inputted via the microphone 19. The image display portion 20 displays images, characters, or graphics. As the image display portion 20, a liquid crystal monitor or suchlike can be used. The input operation portion 21 receives operations inputted through the input portion 121. In the case where the image display portion 20 is a touch panel, the image display portion 20 doubles as the input operation portion 21.

The circuit portion 22 includes a circuit control portion 22a and a storage portion 22b. The circuit control portion 22a executes various operational controls in accordance with input information provided by the operator via the input operation portion 21. The storage portion 22b stores, for example, the input information provided by the operator. As the circuit control portion 22a, a plurality of IC chips or a central processing unit (CPU) is used. As the storage portion 22b, memory such as RAM or ROM is used.

The electronic device body 11 is driven by power supplied by the secondary battery 13.

The operator performs input operation via the input operation portion 21 to transmit a command signal to the circuit control portion 22a. Then, the transmitted command signal triggers a predetermined operation. Also, the input information is stored to the storage portion 22b as necessary.

In addition, the operator speaks into the microphone 19. The produced speech is converted into a radio signal by a circuit inside the circuit portion 22, which is transmitted to another receiver. Furthermore, a radio signal outputted by another receiver is received by an antenna circuit. The received radio signal is converted into a speech signal by a circuit inside the circuit portion 22, which is outputted by the speaker.

Next, the package 10 included in the cell phone 1 will be described. The package 10 has housed therein the electronic device body 11 and the battery housing portion 12. The package 10 is made from, for example, a metallic material or a resin material.

Next, the battery housing portion 12 included in the cell phone 1 will be described in detail.

The battery housing portion 12 includes a battery fitting portion 14 for fitting the secondary battery 13 therein and a lid portion 15 for covering the secondary battery 13 fitted in the battery fitting portion 14, as shown in FIG. 4.

The battery fitting portion 14 is a recessed member having an internal space corresponding to the shape of the secondary battery 13. The recess opening is disposed so as to be directed outward from the package 10 in order to allow battery replacement. The battery fitting portion 14 is provided with a positive terminal portion (not shown) which is brought into contact with the positive terminal (not shown) of the secondary battery 13 to be fitted and a negative terminal portion (not shown) which is brought into contact with the negative terminal (not shown).

The lid portion 15 is a member detachably provided to a portion of the package 10 in which the battery fitting portion 14 is housed. The lid portion 15 is attached so as to cover the secondary battery 13 fitted in the recessed portion, thereby occupying the opening of the recessed portion. The secondary battery 13 is supported by the recessed portion having the secondary battery 13 fitted therein.

As the secondary battery 13 to be housed in the battery housing portion 12, high-capacity and high-energy density secondary batteries, such as lithium-ion secondary batteries and nickel-metal hydride storage batteries, which are conventionally used in portable electronic devices, can be used without limitation. Among them, the lithium-ion secondary batteries are particularly preferable because they have high energy density and can be reduced in size. Note that the secondary battery 13 may be an unit cell or may be in the form of a battery pack including unit cells combined in series or parallel.

The battery fitting portion 14 and the lid portion 15 are preferably made from a resin material or a metallic material. Preferably used as the resin material is a flame-retardant resin composition which includes a matrix resin, such as polycarbonate, polypropylene or polyethylene terephthalate, having a flame retardant added thereto. The flame-retardant resin composition preferably has a flame-retardant rating of V-0 or higher in the UL-94 burn test. Preferably used as the metallic material without limitation is, for example, stainless steel, magnesium alloy, or aluminum alloy.

Furthermore, a heat-insulating layer 16a is provided on a surface of the battery fitting portion 14 that faces the secondary battery 13 (hereinafter, also referred to as a "battery fitting-side surface") and on a surface of the lid portion 15 that faces the secondary battery 13 (hereinafter, a "facing-side surface"), as shown in FIGS. 2 and 5. In this manner, the heat-insulating layer 16a is formed on the surface of the battery housing portion 12 on the side of which the secondary battery 13 is housed.

In such a configuration, the secondary battery 13 housed in the battery housing portion 12 is surrounded by the heat-insulating layer 16a. By providing such a heat-insulating layer 16a, it becomes possible to inhibit heat generated by the secondary battery 13 from being locally conducted to the surface of the package 10. Thus, the surface of the package 10 can be inhibited from being locally heated to high temperature. Moreover, the battery housing portion 12 and the package 10 can be inhibited from being damaged by heat.

The heat-insulating layer 16a has a thickness of from 500 to 3000 μm, preferably from 800 to 1500 μm. When the thickness of the heat-insulating layer 16a is less than 500 μm, the heat-insulating layer 16a has insufficient thermal insulating properties. As a result, the battery fitting portion 14 and the lid portion 15 might be deformed. Also, when the thickness of the heat-insulating layer 16a exceeds 3000 μm, the battery housing portion 12 becomes excessively thick, which reduces the degree of freedom in design for size reduction of the cell phone 1.

Also, the heat-insulating layer 16a has a thermal conductivity of 0.2 W/m·K or lower, preferably 0.05 W/m·K or lower. When the thermal conductivity of the heat-insulating layer 16a exceeds 0.2 W/m·K, thermal insulating properties become insufficient, so that the surface of the package 10 might be locally heated to high temperature when the secondary battery 13 generates heat. As a result, the battery fitting portion 14 and the lid portion 15 might be deformed.

Such a heat-insulating layer 16a is formed in a manner as described below.

The heat-insulating layer 16a is obtained by, for example, forming a coating film through application of a heat-insulating layer formation composition, which contains thermally insulating inorganic compound particles and a binding agent, to the surface on which to form the heat-insulating layer 16a.

An example of the thermally insulating inorganic compound particle is an inorganic compound particle that induces endothermic reaction (hereinafter, simply referred to as an "endothermic inorganic compound particle"). The endothermic inorganic compound particle is preferably an inorganic compound particle having an endothermic peak at a temperature of 80° C. or higher. In the case of the heat-insulating layer 16a containing such endothermic inorganic compound particles, when the secondary battery generates heat, the endothermic inorganic compound particles absorb heat through endothermic reaction. As a result, it is possible to inhibit the surface of the package 10 from being locally heated to high temperature when the secondary battery generates heat.

Examples of the endothermic inorganic compound particle include inorganic hydrates, metal hydroxides and carbonates that have a peak exhibiting a high amount of heat absorption at a temperature of 80° C. or higher, preferably an endothermic peak at a temperature of 80° C. or higher. Specific examples include calcium sulfate dihydrate ($CaSO_4.2H_2O$), sodium hydrogen carbonate ($NaHCO_3$), aluminum hydroxide ($Al(OH)_3$), magnesium hydroxide ($Mg(OH)_2$), and calcium carbonate ($CaCO_3$). They may be used alone or two or more of them may be used in combination. Among them, calcium sulfate dihydrate ($CaSO_4.2H_2O$) is preferable in view of its particularly superior endothermic properties.

Calcium sulfate hemihydrate ($CaSO_4.0.5H_2O$, calcined gypsum) exhibits binding properties when mixed with water and turns into calcium sulfate dihydrate to be cured when dried after application. Calcium sulfate hemihydrate is particularly preferable because it can be used as both the endothermic inorganic compound particle and a binding agent to be described later.

The temperature range in which the endothermic inorganic compound particle exhibits endothermic reaction is from 80 to 150° C. for calcium sulfate dihydrate, from 100 to 230° C. for sodium hydrogen carbonate, from 230 to 350° C. for aluminum hydroxide, from 350 to 450° C. for magnesium hydroxide, and from 690 to 850° C. for calcium carbonate. Accordingly, a suitable combination of these may sustain continuous endothermic reaction.

The size of the endothermic inorganic compound particle is not specifically limited but is preferably from 500 to 3000 μm. If the size of the endothermic inorganic compound particle is within this range, the binding agent has enhanced properties in binding the endothermic inorganic compound particles in the heat-insulating layer 16a. As a result, the heat-insulating layer 16a is inhibited from, for example, locally flaking or cracking, so that the effect of the heat-insulating layer 16a can persist for a long period of time.

As the binding agent, any resin material or inorganic compound can be used without limitation so long as the endothermic inorganic compound particles can be sufficiently bound. Specific examples thereof include, for example, polyvinylidene chloride (PVDC), polyvinylidene fluoride (PVDF), and polytetrafluoroethylene (PTFE). Also, as the inorganic compound, calcium sulfate hemihydrate which turns into calcium sulfate dihydrate when mixed with water and cured is particularly preferable in that it combines both the function of the binding agent and the function of the endothermic inorganic compound particle.

The content of endothermic inorganic compound particles in the heat-insulating layer 16a is preferably 30 to 95% by mass, more preferably 50 to 90% by mass. When the content of endothermic inorganic compound particles is excessively low, the heat-insulating layer 16a tends to have insufficient thermal insulating properties, and when it is excessively high, the heat-insulating layer 16a tends to be susceptible to flaking or tends to have reduced strength.

Also, the content of binding agent in the heat-insulating layer 16a is preferably 5 to 70% by mass, more preferably 5 to 50% by mass.

The heat-insulating layer formation composition can be prepared by dissolving or dispersing inorganic compound particles and a binding agent that have thermal insulating properties in an organic solvent or water. Then, the heat-insulating layer 16a is obtained as a coating film formed by applying the heat-insulating layer formation composition thus prepared to the battery fitting-side surface of the battery housing portion 12 and the facing-side surface of the lid portion 15.

For application of the heat-insulating layer formation composition, any conventionally known application methods can be employed without limitation, including methods such as immersion application, roller application, spray application, and doctor blade application. After application, the coating film that is to serve as the heat-insulating layer 16a is formed by, for example, drying the solvent.

Note that in the present embodiment, the heat-insulating layer 16a is provided on both the battery fitting-side surface of the battery fitting portion 14 and the facing-side surface of the lid portion 15 but the heat-insulating layer 16a may be provided on only one of them.

Second Embodiment

Next, a cell phone of a second embodiment will be described. The cell phone of the second embodiment is configured in the same manner as the cell phone 1 of the first embodiment except that the heat-insulating layer is structured differently. To avoid overlapping descriptions, descriptions other than detailed descriptions of the heat-insulating layer structure will be omitted.

Figure 6:
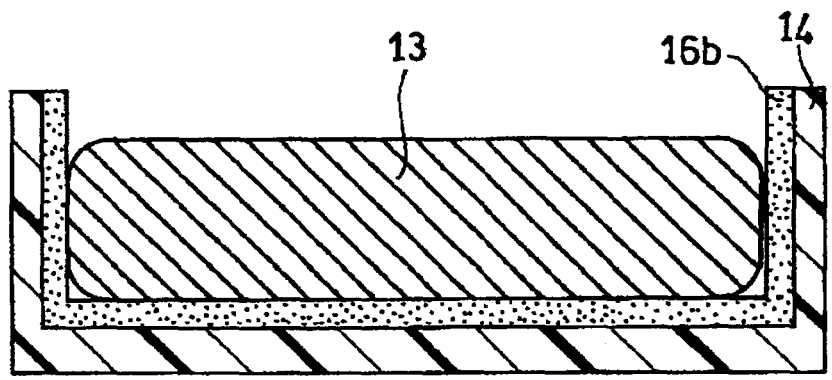
FIG. 6 is a longitudinal sectional view schematically illustrating the configuration of a substantial part of a cell phone battery housing portion in a second embodiment.

FIG. 6 is a longitudinal sectional view schematically illustrating the configuration of a substantial part of the cell phone battery housing portion in the second embodiment. The cell phone of the second embodiment has a heat-insulating layer 16b to be described below formed in the battery housing portion, in place of the heat-insulating layer 16a formed in the battery housing portion 12 of the cell phone 1 in the first embodiment.

The heat-insulating layer 16b is formed by laminating an inorganic fiber sheet on the battery fitting-side surface of the battery fitting portion 14 and the facing-side surface of the lid portion 15, as shown in FIG. 6.

As the inorganic fiber sheet, a conventionally known, thermally insulating fiber sheet made of, for example, inorganic fiber-woven or nonwoven cloth or paper is used without limitation. Examples of such an inorganic fiber sheet include, for example, inorganic fiber sheets made from glass wool or rock wool. Such inorganic fiber sheets may be used alone or two or more of them may be used in combination.

The thermal conductivity of the inorganic fiber sheet is preferably 0.1 W/m·K or lower, more preferably 0.05 W/m·K or lower. When the thermal conductivity of the inorganic fiber sheet is excessively high, thermal insulating properties tend to be insufficient. Note that, for example, the thermal conductivity of glass wool is approximately 0.045 W/m·K.

The thickness of the inorganic fiber sheet is not specifically limited. Concretely, it is preferably in the range from, for example, 500 to 3000 μm. Also, the weight per unit area of the inorganic fiber sheet is preferably 30 to 1000 mg/cm$^2$.

The heat-insulating layer 16b can be formed by bonding the inorganic fiber sheet to the battery fitting-side surface of the battery fitting portion 14 and the facing-side surface of the lid portion 15. Also, instead of bonding, the inorganic fiber sheet may be fixed by catches previously provided on the battery fitting-side surface of the battery fitting portion 14 for fixing the inorganic fiber sheet.

Next, another cell phone of the second embodiment will be described. The cell phone of the present embodiment is configured in the same manner as the cell phone 1 of the first embodiment except that the heat-insulating layer is structured differently. To avoid overlapping descriptions, descriptions other than detailed descriptions of the heat-insulating layer structure will be omitted.

Figure 7:
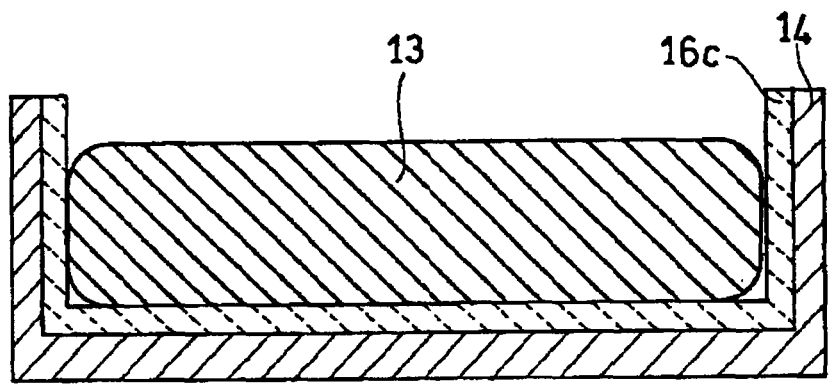
FIG. 7 is a longitudinal sectional view schematically illustrating the configuration of a substantial part of another cell phone battery housing portion in the second embodiment.

FIG. 7 is a longitudinal sectional view schematically illustrating the configuration of a substantial part of the other cell phone battery housing portion in the second embodiment. The cell phone of the present embodiment has a heat-insulating layer 16c to be described below formed in the battery housing portion 12, in place of the heat-insulating layer 16a formed in the battery housing portion 12 of the cell phone 1 in the first embodiment.

The heat-insulating layer 16c is formed by laminating a porous resin sheet on the battery fitting-side surface of the battery fitting portion 14 and the facing-side surface of the lid portion 15, as shown in FIG. 7.

Specific examples of the porous resin sheet include conventionally known materials, e.g., foam sheets such as urethane foam and styrene foam; vacuum insulation materials; and expandable insulation materials.

The vacuum insulation material is an insulation material having a porously structured core coated with a laminate film and sealed under reduced internal pressure. For example, urethane foam, glass wool, and silica powder can be used for the core.

The expandable insulation material is a resin insulation material containing ingredients that expand instantly when exposed to high temperature, thereby forming a porous body. A specific example of the expandable insulation material is, for example, Fiblock (trade name, manufactured by Sekisui Chemical Co., Ltd.).

The thermal conductivity of the porous resin sheet is preferably 0.1 W/m·K or lower, more preferably 0.05 W/m·K or lower. When the thermal conductivity of the porous resin sheet is excessively high, thermal insulating properties tend to be insufficient.

The thickness of the porous resin sheet is not specifically limited. Concretely, it is preferably in the range from, for example, 500 to 3000 μm. Also, preferably, the weight per unit area of the porous resin sheet is 10 to 500 mg/cm$^2$.

The heat-insulating layer 16c can be formed by bonding the porous resin sheet to the battery fitting-side surface of the battery fitting portion 14 and the facing-side surface of the lid portion 15. Also, instead of bonding, the porous resin sheet may be fixed by catches previously provided on the battery fitting-side surface of the battery fitting portion 14 for fixing the porous resin sheet. In the present embodiment, the battery fitting portion 14 and the lid portion 15 are formed using a metallic material.

In the present specification, the heat-insulating layer 16a, the heat-insulating layer 16b and the heat-insulating layer 16c may be collectively referred to as heat-insulating layers 16.

Third Embodiment

Figure 8:
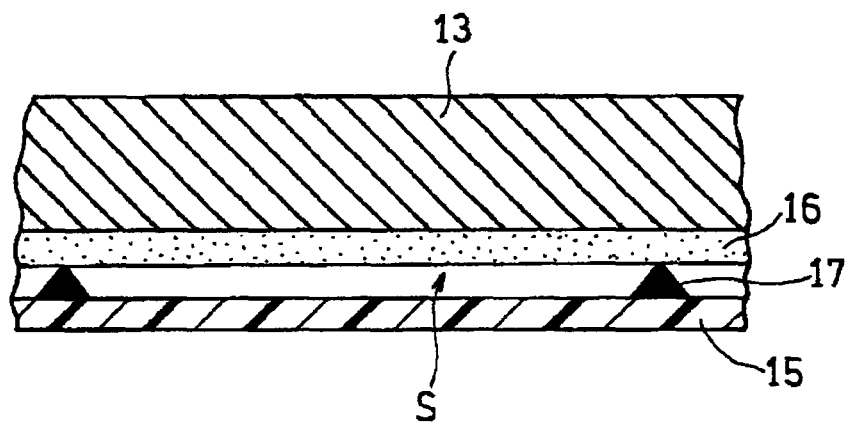
FIG. 8 is a longitudinal sectional view schematically illustrating the configuration of a substantial part of a cell phone battery housing portion in a third embodiment.
Figure 9:
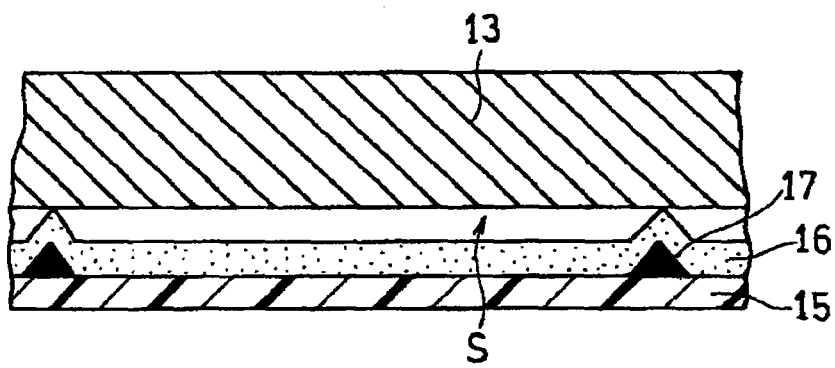
FIG. 9 is a longitudinal sectional view schematically illustrating the configuration of a substantial part of another cell phone battery housing portion in the third embodiment.
Figure 10:
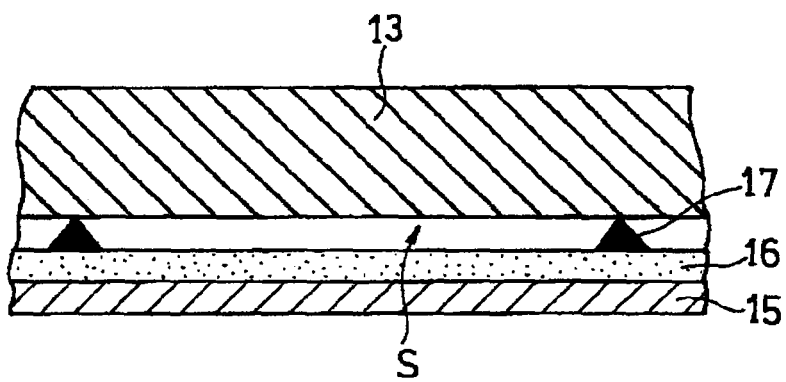
FIG. 10 is a longitudinal sectional view schematically illustrating the configuration of a substantial part of another cell phone battery housing portion in the third embodiment.

Next, a cell phone of a third embodiment will be described. FIGS. 8 to 10 are longitudinal sectional views each schematically illustrating a portion in which ribs 17 are formed in a variant where the ribs 17 are formed on the surface of the battery housing portion 12 described in the first embodiment.

The cell phone of the third embodiment has the ribs 17 formed for creating space S between the surface of the battery housing portion 12 and the surface of the secondary battery 13 fitted in the battery fitting portion 14. Other than that is the same as in the case of the battery housing portion 12 of the first embodiment. To avoid overlapping descriptions, descriptions other than detailed descriptions of the battery housing portion will be omitted.

FIG. 8 is a longitudinal sectional view schematically illustrating a portion of the battery housing portion 12 in which the ribs 17 are formed. While FIG. 8 shows the ribs 17 being formed on the lid portion 15 which constitutes part of the battery housing portion 12, ribs 17 are similarly formed on the surface of the battery fitting portion 14.

As shown in FIG. 8, the battery housing portion 12 has a plurality of ribs 17 formed on the surface of the lid portion 15. In addition, the ribs 17 bring the surface of the lid portion 15 and the surface of the secondary battery 13 into point contact with each other, thereby creating space S. Space S created as such is an air space having an extremely low thermal conductivity. Accordingly, by forming the ribs 17, it becomes possible to allow the air space to further inhibit thermal conduction to the surface of the package 10 when the secondary battery 13 generates heat.

While the shape of the rib 17 is not specifically limited, a tapering shape such as a cone or a pyramid is particularly preferable. A tapering shape can support the secondary battery 13 with a small contact area. As a result, it is possible to render heat generated by the secondary battery 13 less conductive to the surface of the package 10.

Also, the height of the rib 17 is not specifically limited so long as sufficient space can be provided between the surface of the battery fitting portion 14 and the surface of the secondary battery 13 fitted therein. Specifically, for example, it is in the range preferably from 0.5 to 3.0 mm, more preferably from 0.8 to 15 mm.

The ribs 17 may be integrally molded with a molding of the battery housing portion 12 or may be formed by bonding or welding another member to the molding of the battery housing portion 12. In the example shown in FIG. 8, space S is created by the ribs 17 between the surface of the battery housing portion 12 and the heat-insulating layer 16.

Also, as shown in FIG. 9, the heat-insulating layer 16 formed directly on the surface of the lid portion 15 of the battery housing portion 12 may allow the ribs 17 on the lid portion 15 to stand out to create space S between the surface of the heat-insulating layer 16 and the surface of the secondary battery 13. In addition, as shown in FIG. 10, the heat-insulating layer 16 previously provided with ribs 17 may be bonded to the surface of the lid portion 15, thereby creating space S between the surface of the heat-insulating layer 16 and the surface of the secondary battery 13. While FIGS. 9 and 10 show the ribs 17 being formed on the lid portion 15 which constitutes part of the battery housing portion 12, ribs 17 may be similarly formed on the surface of the battery fitting portion 14.

Fourth Embodiment

Next, a cell phone 30 of a fourth embodiment will be described with reference to FIG. 11. The cell phone 30 of the fourth embodiment is configured in the same manner as the cell phone 1 of the first embodiment except that the battery housing portion is structured differently. To avoid overlapping descriptions, descriptions other than detailed descriptions of the battery housing portion structure will be omitted.

Figure 11:
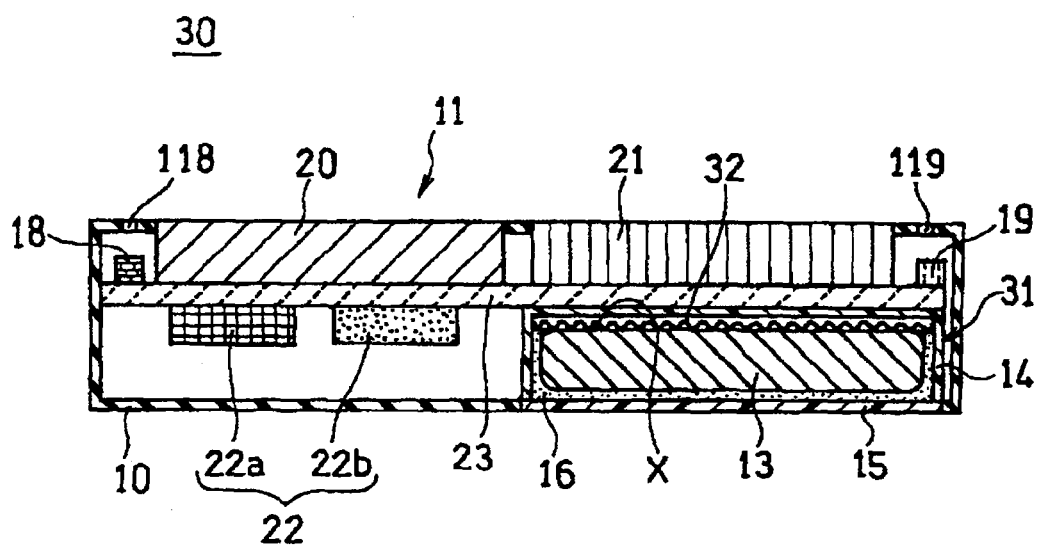
FIG. 11 is a longitudinal sectional view schematically illustrating the configuration of a cell phone in a fourth embodiment.

FIG. 11 is a longitudinal sectional view schematically illustrating the configuration of the cell phone 30, which is a portable electronic device of the fourth embodiment. The cell phone 30 of the fourth embodiment has a battery housing portion 31 to be described below, in place of the battery housing portion 12 of the cell phone 1 of the first embodiment.

The battery housing portion 31 has a heat dissipation layer 32 formed on the inner-side ("X" side in the figure) surface of the battery fitting portion 14. By forming such a heat dissipation layer 32, it becomes possible to diffuse heat generated by the secondary battery 13 toward the inside of the cell phone 30. On the other hand, the heat-insulating layer 16 is formed on the surface of the lid portion 15 that faces the secondary battery 13. By forming such a heat-insulating layer 16, it becomes possible to render heat generated by the secondary battery 13 less conductive to the surface of the package 10 of the cell phone 30.

As a result, it is possible to inhibit a sharp local temperature rise on the surface of the package 10 which is directly touched by the user of the portable electronic device. Thus, even when the secondary battery 13 generates abnormal heat, the user feels less the abnormal heat generated by the secondary battery 13.

The heat dissipation layer 32 is formed by laminating a heat dissipator with high heat releasing properties on the inner-side ("X" side in the figure) surface of the battery fitting portion 14 within the package 10, as shown in FIG. 11. As the heat dissipator, a sheet or suchlike made from a metallic material or graphite is used.

The thickness of the heat dissipation layer 32 is preferably 10 to 200 μm, more preferably 30 to 100 μm. When the heat dissipation layer 32 is excessively thin, heat-releasing properties become insufficient. Also, when the heat dissipation layer 32 is excessively thick, the size of the battery housing portion 31 increases, resulting in a reduced degree of freedom in design for the cell phone 30.

Moreover, the thermal conductivity of the heat dissipation layer 32 is preferably 0.5 W/m·K or higher, more preferably 1.0 W/m·K or higher. When the thermal conductivity of the heat dissipation layer 32 is excessively low, the heat-releasing properties become insufficient.

Furthermore, the heat-insulating layer 16 used is similar to that described in the first or second embodiment. In this case, the thickness of the heat-insulating layer 16 is 300 to 3000 μm. When the thickness of the heat-insulating layer 16 is less than 300 μm, the heat-insulating layer 16 has insufficient thermal insulating properties. As a result, the battery fitting portion 14 and/or the lid portion 15 might be deformed. Also, when the thickness of the heat-insulating layer 16 exceeds 3000 μm, the battery housing portion 31 becomes excessively thick, resulting in a reduced degree of freedom in design for size reduction of the cell phone 1.

In the case of a portable electronic device with a limited volume, such as the cell phone 30 of the present embodiment or a mobile device, the heat-insulating layer 16 is preferably thicker than the heat dissipation layer 32. As a result, it is possible to inhibit heat generation of the secondary battery 13 and rise in surface temperature of the portable electronic device while maintaining the low volume of the portable electronic device.

While the portable electronic device of the present invention has been described in detail by way of exemplary cell phones of the first to fifth embodiments, the present invention is naturally applicable to portable electronic devices other than the cell phones. Specifically, the present invention can be applicable to, for example, PDAs, game machines, digital still cameras (DSCs), portable music devices, and portable electronic devices, such as notebook computers and portable camcorders, which have a battery pack including a combination of secondary cells as a power source. Moreover, the technical features of the present invention are also applicable to exterior materials for large secondary batteries for use as power sources of electric vehicles, for example.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The portable electronic device of the present invention is advantageous in that, if by any chance a secondary battery generates heat, the shape thereof is maintained and an abrupt surface temperature rise is inhibited, and it can be used in the same applications as conventional portable electronic devices.

The invention claimed is:

1. A portable electronic device having a secondary battery as a power source, comprising:
a package, an electronic device body housed in the package, and a battery housing portion housed in the package, wherein:
the secondary battery is a lithium ion secondary battery,
the battery housing portion is a molding with a battery fitting portion for fitting the secondary battery therein,
the battery fitting portion has provided on its surface a heat-insulating layer having a thickness of from 500 to 3000 µm and a thermal conductivity of 0.2 W/m·K or lower,
the heat-insulating layer is a layer containing 30 to 95% by mass of endothermic inorganic compound particles and 5 to 70% by mass of binding agent, and
the endothermic inorganic compound particle having an endothermic peak at a temperature of 80° C. or higher.

2. The portable electronic device according to claim 1, wherein the battery fitting portion has formed on the surface ribs for ensuring a space relative to a surface of the secondary battery.

3. The portable electronic device according to claim 1, wherein the endothermic inorganic compound particles comprise at least one of particles selected from the group consisting of inorganic hydrate, metal hydroxide and carbonate.

4. The portable electronic device according to claim 1, wherein the endothermic inorganic compound particles comprise at least one of particles selected from the group consisting of calcium sulfate dihydrate, sodium hydrogen carbonate, aluminum hydroxide, magnesium hydroxide and calcium carbonate.

5. The portable electronic device according to claim 1, wherein the secondary battery is in the form of a battery pack including unit cells combined in series or parallel.

6. The portable electronic device according to claim 1, wherein the endothermic inorganic compound particles comprise calcium sulfate dihydrate.

7. The portable electronic device according to claim 1, wherein the binding agent is at least one of polyvinylidene chloride (PVDC), polyvinylidene fluoride (PVDF) and polytetrafluoroethylene (PTFE).

* * * * *